Aug. 7, 1945.   G. S. CHAPMAN   2,381,485
CUTTING TOOL
Filed Oct. 31, 1942
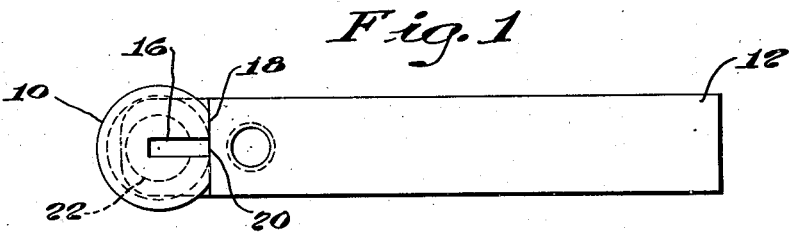
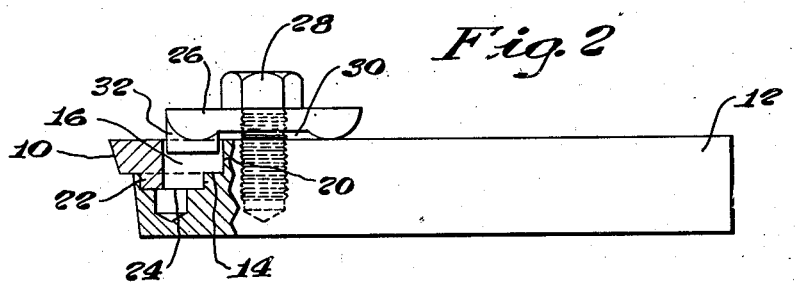
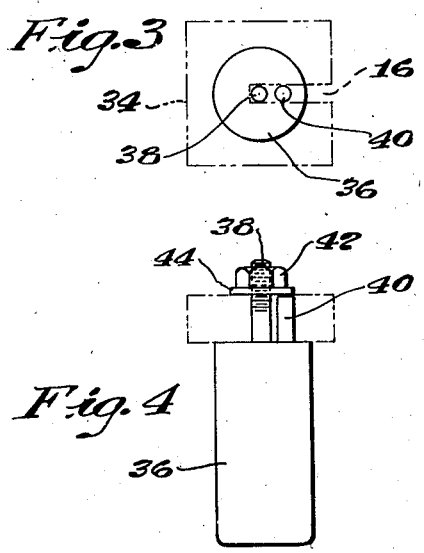
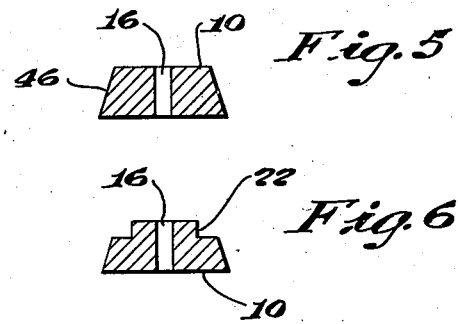
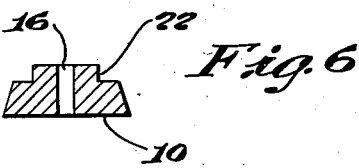
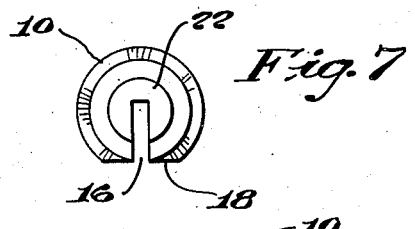
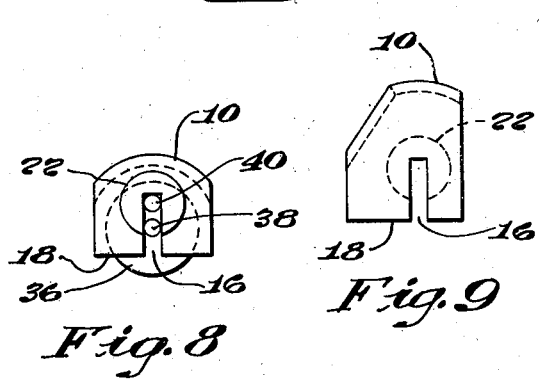
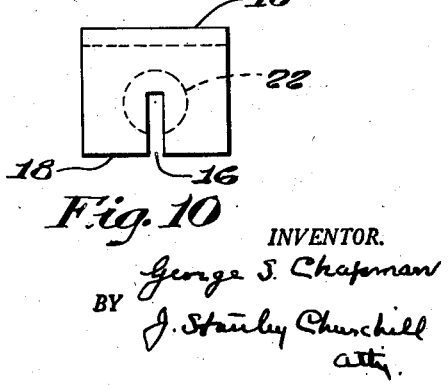
INVENTOR.
George S. Chapman
BY J. Stanley Churchill
atty.

Patented Aug. 7, 1945

2,381,485

UNITED STATES PATENT OFFICE 2,381,485

CUTTING TOOL

George S. Chapman, Dedham, Mass.

Application October 31, 1942, Serial No. 464,021

6 Claims. (Cl. 29—102)

This invention relates to a cutting tool and to a method of making the same.

The invention has for one of its objects to provide a novel and improved cutting tool characterized by a structure which enables its production from a relatively small piece of high speed hardened cutting steel whereby those small pieces which might otherwise be discarded or junked may be salvaged and reused.

Another object of the invention is to provide a novel and improved method of making a cutting tool, such as a lathe tool by which a substantially uniform radius may be obtained to produce a radius cutter, such cutters being manufactured from relatively small pieces of high speed hardened cutting steel.

A further object of the invention is to provide a novel and improved cutting tool embodying a detachable cutting member and a holder therefor, which may be economically manufactured and easily assembled, and embodies a minimum amount of high speed hardened cutting steel.

With these general objects in view, and such others as may hereinafter appear, the invention consists in the cutting tool and in the method of making the same as hereinafter described and particularly defined in the claims at the end of this specification.

In the drawing illustrating the preferred embodiment of the invention, Fig. 1 is a plan view of a cutting tool and holder therefor embodying the present invention; Fig. 2 is a side elevation of the same, the cutting tool being shown in cross section; Figs. 3 and 4 are plan and side elevations respectively of a fixture for holding the high speed hardened cutting steel blank during the grinding operations; Figs. 5 and 6 are cross sectional views illustrating the steps in grinding a radius cutter; Fig. 7 is a bottom view of one type of cutter produced in accordance with the present invention; and Figs. 8, 9 and 10 are plan views of other typical forms of cutters which may be interchangeably employed in the present holder.

In general, the present invention contemplates a novel and improved cutting tool which may be produced from those relatively small sections of high speed cutting steel which comprise the worn out standard cutting tools, such for example as the usual elongated lathe tool or the removable blades of a milling cutter. Such pieces, after they have been ground down to their maximum limit during use in the prior holders, are generally discarded as being too small for any further practical use. In accordance with the present invention such small pieces may be salvaged and used in producing cutters which may be interchangeably mounted in a novel holder adapted to be clamped in the usual support or cross slide of a lathe or screw machine.

Another feature of the present invention comprises a novel and improved method of grinding a radius cutter to obtain a uniform radius. Since the small salvaged pieces or blanks of high speed hardened cutting steel are not provided with a central opening by which to hold the pieces while grinding a circular cutting edge, and since it is exceedingly difficult or impractical to drill such a hole in the hardened cutting steel, such pieces have heretofore been ground into circular form manually or by eye with varying degrees of success, and as a result, it has been difficult to obtain a circular cutting edge of uniform radius by this method. In accordance with the present method, a slot is ground into one side of the blank extending approximately to the center of the blank, thus providing a means by which the blank may be held centrally while grinding the cutting edge into circular form. The present method also includes a fixture formed on an arbor in which the slotted blank may be held for rotation during the grinding operation.

Still another feature of the present invention comprises a novel holder for the relatively small cutting tools adapted to interchangeably hold the cutting tools produced in accordance with the present invention.

Referring now to the drawing, 10 represents a cutting tool made in accordance with the present invention, herein illustrated as a radius cutter shown mounted in a holder 12 adapted to be received in the tool supporting member mounted on the cross slide of a lathe or screw machine. As herein shown, the relatively small high speed hardened steel cutting member 10 is arranged to fit into a recessed portion 14 of the holder. The cutting member is provided with a slotted portion 16 and is preferably flattened on one side as at 18 to fit snugly against the offset portion 20 of the recessed holder. The underside of the cutting member 10 is provided with a circular shoulder portion 22 which is arranged to fit snugly into a counterbored hole 24 formed in the recessed portion 14. The cylindrical shouldered portion 22 is concentric with the circular cutting edge, whose center is disposed at the closed end of the slotted portion 16. The distance from such center to the flattened portion 18 of the cutting member corresponds to the distance from the hole 24 to the offset portion 20 so that when the cutting member is placed in the holder it is held from lateral movement.

The holder 12 may comprise cold rolled steel or the like, and, as herein shown, in order to hold the cutting member from vertical displacement, the holder is provided with a clamping member 26. The clamping member 26 may comprise a flat bar held in place by a bolt 28, as shown. The clamping member is preferably provided with a recessed portion 30 on its underside intermediate the ends of the clamp and is preferably rounded at the engaging ends in order to assure continuous engagement of the contacting portions. In order to prevent turning of the clamping member when in its clamped position and in order to further support the cutting member from lateral displacement, the end of the clamping member engaging the cutter is provided with a tongue 32 which fits into the slotted portion 16, as shown.

With this construction, it will be observed that the holder 12 is adapted to receive and be used for holding different forms of cutters, typical of which are illustrated in Figs. 8, 9, and 10, each of which is provided with the slotted portion 16, flat portion 18 and the cylindrical shouldered portion 22 corresponding to the hole 24 and offset portion 20 of the holder.

From the description thus far, it will be observed that the relatively small pieces of high speed hardened cutting steel which usually have been heretofore discarded, may be utilized to form cutting tools adapted to be mounted in the present holder as described, thus effecting a saving of the relatively expensive tool steel and providing an efficient cutting tool which may be manufactured at a minimum of expense.

As above stated one of the prior difficulties encountered in attempting to utilize small scrap pieces of tool steel was the inability to provide means for successfully mounting the piece for grinding, particularly when it was desired to form a radius cutter. In accordance with the present method, the substantially rectangular blank 34 indicated in dotted lines in Fig. 3, is first provided with the slotted portion 16 by grinding the slot from one side of the blank and extending the slot into substantially the center of the blank. The blank thus slotted is then clamped in a fixture, herein shown as an arbor 36 adapted to be received in the chuck or other holding member of a grinding machine. The fixture is provided with a central pin 38 threaded at its upper end, and with an offset stud 40. In practice, the slotted portion is slipped over the pins, as shown, so that the closed end of the slot embraces the central pin 38 and the work is clamped in position by a nut 42 and washer 44 provided on the central stud. With the work thus mounted, the blank may be rotated and ground to produce a cutting surface forming a part of a perfect circle of the desired radius, the grinding preferably being done at an angle to provide the usual clearance angle 46 for the cutting member. This step in the grinding operation is illustrated in Fig. 5. The next step in the grinding operation is to provide the cylindrical shouldered portion 22 for reception in the bored hole 24 of the holder and this operation may likewise be performed while the work is held in the fixture as above described. The last operation comprises grinding the flattened portion 18 to fit the cutter into the holder 12, as described.

From the above description it will be observed that a blank of high speed hardened cutting steel may be easily and economically ground to obtain a cutting surface having a single radius. Furthermore, cutters of other shapes, such as the straight edged tool illustrated in Fig. 10 may be provided with the cylindrically ground shouldered portion 22 in accordance with the present method so as to adapt it for reception in the present holder. Another expedient which may be employed, as illustrated in Fig. 8, comprises turning the cutting member around so that the end of the slotted portion embraces the offset stud 40 which has the effect of changing the center of rotation of the work the amount of the distance from the central pin to the offset stud. This expedient may be employed when a relatively large radius is desired on the cutting edge of a relatively small blank, as illustrated in Fig. 8.

While the cutting member may be formed from discarded pieces of high speed cutting steel, it is to be understood that any desired high speed cutting steel blanks may be used.

While the preferred embodiment of the invention has been herein illustrated and described, it will be understood that the invention may be embodied in other forms within the scope of the following claims.

Having thus described the invention, what is claimed is:

1. A cutting tool comprising a relatively small cutting member having an arcuate cutting edge, a holder bar having a recessed portion at one end for receiving said cutting member, said recessed portion including a longitudinal surface having a round hole formed therein, means for preventing lateral displacement of the cutting member in the holder including a cylindrical hub portion on the underside of the cutting member shaped to fit said hole in said recessed portion of the holder, said cylindrical hub being concentric with said arcuate cutting edge, and a clamping member engaging with the holder bar and the top of the cutting member to removably clamp the cutting tool upon the holder.

2. A cutting tool comprising a relatively small cutting member having an arcuate cutting edge and having a straight slotted portion therein, a holder shaped to hold the cutting member and provided with a round hole, said cutting member having a cylindrical hub portion on its underside arranged to fit into said hole, said cylindrical hub portion being concentric with said arcuate cutting edge, and a clamping member engaging said holder and the top of said cutting member provided with a flat tongue portion arranged to fit into said straight slotted portion to clamp the cutting member upon the holder.

3. A cutting tool comprising a relatively small cutting member having an arcuate cutting edge and having a slotted portion therein, said arcuate cutting edge being defined by a radius having its center on a line passing through said slotted portion, a holder shaped to receive the cutting member and provided with a round hole and with an upstanding wall adapted to engage one edge of the cutting member, said cutting member having a cylindrical hub portion on its underside arranged to fit into said hole, the center of said cylindrical hub portion being also disposed on the line passing through said slotted portion and spaced from said first center, and a clamping member engaging said holder and the top of said cutting member provided with a tongue portion arranged to fit into said slotted portion, to removably clamp the cutting member in the holder.

4. A cutting tool comprising: a relatively small cutting member having an arcuate cutting edge, a holder recessed at one end for receiving said cutting member, said recess being defined by a horizontal surface and an upright shoulder, said horizontal surface having a round aperture and said cutting member having a cylindrical projection fitting into said aperture to prevent lateral movement of said cutting member with respect to said holder, said cylindrical projection being concentric with said arcuate cutting edge, said cutting member also having a flat portion engaging said shoulder to prevent rotation of said cutting member relative to said holder, and a clamping member engageable with the top of said cutting member to clamp it upon said holder against upward movement relative to said holder, whereby said cutting member is held from movement in all directions relative to said holder.

5. A cutting tool as defined in claim 4, in which the cutting member is provided with a straight slot and said clamping member is provided with a flat tongue extending into said slot.

6. A cutting tool comprising a holder and a cutting member adapted for use in said holder, comprising a body of high speed hardened cutting steel having an arcuate cutting edge ground to uniform radius and having a straight radial slot extending inwardly from one edge thereof to a point slightly beyond the center of said radius, said slot enabling the cutting member to be held and rotated on its center with respect to said arcuate cutting edge for regrinding and sharpening purposes, said slot also cooperating with portions of said holder to assist in securing the cutting member thereto.

GEORGE S. CHAPMAN.